(12) United States Patent
Discekici et al.

(10) Patent No.: US 12,109,757 B2
(45) Date of Patent: Oct. 8, 2024

(54) THREE-DIMENSIONAL PRINTING WITH POLYELECTROLYTES

(71) Applicant: Hewlett-Packard Development Company, L.P., Spring, TX (US)

(72) Inventors: Emre Hiro Discekici, San Diego, CA (US); Graciela Emma Negri Jimenez, San Diego, CA (US); Shannon Reuben Woodruff, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 180 days.

(21) Appl. No.: 17/298,651

(22) PCT Filed: Aug. 6, 2019

(86) PCT No.: PCT/US2019/045313
§ 371 (c)(1),
(2) Date: May 31, 2021

(87) PCT Pub. No.: WO2021/025690
PCT Pub. Date: Feb. 11, 2021

(65) Prior Publication Data
US 2022/0152919 A1    May 19, 2022

(51) Int. Cl.
*B29C 64/165*    (2017.01)
*B29C 64/188*    (2017.01)
(Continued)

(52) U.S. Cl.
CPC .......... *B29C 64/165* (2017.08); *B29C 64/188* (2017.08); *B33Y 10/00* (2014.12); *B33Y 70/00* (2014.12); *B29K 2995/0092* (2013.01)

(58) Field of Classification Search
CPC ..... B29C 64/165; B29C 64/188; B33Y 10/00; B33Y 70/00; B29K 2995/0092
See application file for complete search history.

(56) References Cited

U.S. PATENT DOCUMENTS

| 7,087,109 B2 | 8/2006 | Bredt et al. |
| 10,293,555 B2 | 5/2019 | Kojima et al. |

(Continued)

FOREIGN PATENT DOCUMENTS

| CN | 101585549 A | 11/2009 |
| CN | 106925773 | 7/2017 |

(Continued)

OTHER PUBLICATIONS

Lubrizol Product Data Sheet, pp. 1-2, 2021 (Year: 2021).*

*Primary Examiner* — Jeffrey M Wollschlager
(74) *Attorney, Agent, or Firm* — Dierker & Kavanaugh, P.C.

(57) ABSTRACT

A multi-fluid kit for three-dimensional printing can include a fusing agent comprising water and a radiation absorber, wherein the radiation absorber absorbs radiation energy and converts the radiation energy to heat. The multi-fluid kit can also include a detailing agent including an aqueous liquid vehicle and from about 1 wt % to about 12 wt % polyelectrolyte solubilized in the aqueous liquid vehicle at from about 90 wt % to 100 wt %. The polyelectrolyte can have a weight average molecular weight from about 1,000 Mw to about 12,000 Mw and can be water-absorbent at a water to polyelectrolyte weight ratio from about 2:1 to about 1,000:1.

14 Claims, 4 Drawing Sheets

(51) Int. Cl.
B33Y 10/00 (2015.01)
B33Y 70/00 (2020.01)

(56) References Cited

U.S. PATENT DOCUMENTS

| | | | |
|---|---|---|---|
| 11,485,870 B2* | 11/2022 | Prasad | B33Y 70/00 |
| 2005/0046067 A1 | 3/2005 | Oriakhi et al. | |
| 2005/0059757 A1 | 3/2005 | Bredt et al. | |
| 2005/0080191 A1 | 4/2005 | Kramer et al. | |
| 2006/0192315 A1 | 8/2006 | Farr et al. | |
| 2006/0208388 A1 | 9/2006 | Bredt et al. | |
| 2006/0230984 A1 | 10/2006 | Bredt et al. | |
| 2012/0289607 A1 | 11/2012 | Xiong et al. | |
| 2018/0272607 A1* | 9/2018 | Chaffins | B28B 1/001 |
| 2018/0290925 A1 | 10/2018 | Poulesquen et al. | |
| 2018/0311892 A1* | 11/2018 | Abbott, Jr. | B28B 11/243 |
| 2018/0333914 A1* | 11/2018 | Rudisill | B29C 64/165 |
| 2019/0030797 A1* | 1/2019 | Ge | B29C 64/336 |
| 2019/0047216 A1* | 2/2019 | Emamjomeh | B33Y 10/00 |

FOREIGN PATENT DOCUMENTS

| | | |
|---|---|---|
| CN | 108084342 | 5/2018 |
| CN | 108250704 | 7/2018 |
| EP | 2269808 A1 | 1/2011 |
| WO | WO2017146741 * | 8/2017 |
| WO | 2017/213666 A1 | 12/2017 |
| WO | 2018/095837 A1 | 5/2018 |
| WO | 2019/108288 A1 | 6/2019 |

\* cited by examiner

THREE-DIMENSIONAL PRINTING WITH POLYELECTROLYTES

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. This technology has been somewhat limited with respect to commercial production capabilities because the range of materials used in 3D printing has been likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
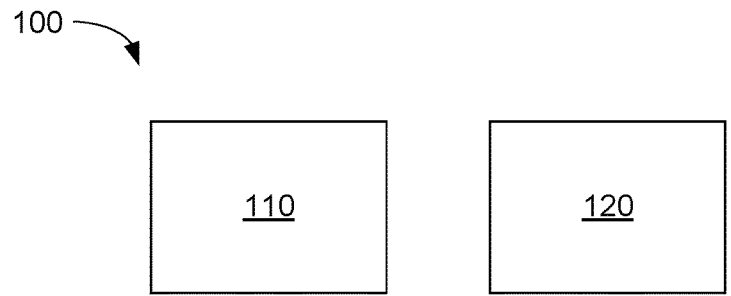
FIG. 1 is a schematic view of an example multi-fluid kit for three-dimensional printing in accordance with examples of the present disclosure.

Multi-fluid kits, three-dimensional printing kits, and methods described herein can be used to make three-dimensional printed articles good thermal bleed control. Thermal bleed, when not controlled, can compromise printed three-dimensional (3D) parts printed using multi-jet fusion additive manufacturing processes. For example, as a certain amount of heat is used to achieve fusion of polymer particles of a powder bed material, particularly fusion between layers, combined with the (often) constant heat input to maintain powder bed temperatures, controlling heat dissipation can be complex. Thus, the polyelectrolytes described herein, such as for example anionic linear polyelectrolytes with a weight average molecular weight from about 1,000 Mw to 12,000 Mw, can be used to dissipate heat at a border region between the 3D printed part and the powder surrounding the printed part in the powder bed.

In accordance with this, the present disclosure includes multi-fluid kits for three-dimensional printing, which can include a fusing agent including water and a radiation absorber to absorb and convert radiation energy to heat, and a detailing agent including an aqueous liquid vehicle and from about 1 wt % to about 12 wt % polyelectrolyte solubilized in the aqueous liquid vehicle at from about 90 wt % to 100 wt %. The polyelectrolyte in this example can have a weight average molecular weight from about 1,000 Mw to about 12,000 Mw and can be water-absorbent at a water to polyelectrolyte weight ratio from about 2:1 to about 1,000:1. In one example, the polyelectrolyte can be an anionic linear polyelectrolyte. In another example, the polyelectrolyte can be a strong polyelectrolyte that is fully dissociated in the aqueous liquid vehicle. The polyelectrolyte can include, for example, poly(acrylic acid sodium salt), poly(acrylic acid potassium salt), poly(acrylic acid lithium salt, poly(acrylic acid ammonium salt), or a combination thereof. The polyelectrolyte can alternatively be present in the detailing agent from about 4 wt % to about 8 wt %. The radiation absorber can be a metal dithiolene complex, carbon black, a near-infrared absorbing dye, a near-infrared absorbing pigment, metal nanoparticles, a conjugated polymer, or a combination thereof. In some examples, the fusing agent can be colorless.

In further detail, a three-dimensional printing kit can include a powder bed material including from about 60 wt % to 100 wt % polymer particles, a fusing agent including water and a radiation absorber to absorber absorb radiation energy and convert the radiation energy to heat, and a detailing agent. The detailing agent can include an aqueous liquid vehicle and from 1 wt % to 12 wt % polyelectrolyte solubilized in the aqueous liquid vehicle at from about 90 wt % to 100 wt %. The polyelectrolyte can have a weight average molecular weight from 1,000 Mw to 12,000 Mw and is water-absorbent at a water to polyelectrolyte weight ratio from 2:1 to about 1,000:1. The polymer particles can include polyamide 6, polyamide 9, polyamide 11, polyamide 12, polyamide 6/6, polyamide 6/12, polyethylene, thermoplastic polyurethane, polypropylene, polyester, polycarbonate, polyether ketone, polyacrylate, polystyrene powder, wax, or a combination thereof. The polyelectrolyte can be an anionic linear polyelectrolyte having a weight average molecular weight from about 1,200 Mw to about 5,000 Mw. The radiation absorber can be a metal dithiolene complex, carbon black, a near-infrared absorbing dye, a near-infrared absorbing pigment, metal nanoparticles, a conjugated polymer, or a combination thereof.

In another example, a method of making a three-dimensional printed article can include iteratively applying individual powder bed material layers of polymer particles to a powder bed, and based on a three-dimensional object model, selectively applying a fusing agent onto the individual powder bed material layers, wherein the fusing agent includes water and a radiation absorber. The method can further include, based on the three-dimensional object model, selectively applying a detailing agent onto individual powder bed material layers laterally at a border region between a first area where the powder bed material is contacted by the fusing agent and a second area where the powder bed material is not contacted by the fusing agent, wherein the detailing agent includes an aqueous liquid vehicle and a polyelectrolyte. The method can further include exposing the powder bed to energy to selectively fuse the polymer particles in contact with the radiation absorber to form a fused polymer matrix at individual powder bed material layers while at the same time retaining water associated with the polyelectrolyte at the border at a water to polyelectrolyte weight ratio from about 2:1 to about 1,000:1. In one example, the polyelectrolyte can be an anionic linear polyelectrolyte having a weight average molecular weight from about 1,000 Mw to about 12,000 Mw. The polyelectrolyte can include poly(acrylic acid sodium salt), poly(acrylic acid potassium salt), poly(acrylic acid lithium salt, poly(acrylic acid ammonium salt), or a combination thereof, for example. The method can also further include selectively applying the detailing agent to build areas to control a temperature of a layer or layers of the three-dimensional printed article while being formed.

It is noted that when describing the multi-fluid kits, the three-dimensional printing kits, and the methods of making three-dimensional printed articles, these relative discussions can be considered applicable to the other examples, whether or not they are explicitly discussed in the context of that example. Thus, for example, in discussing a fusing agent related to the multi-fluid kits, such disclosure is also relevant to and directly supported in the context of the three-dimensional printing kits and methods of manufacturing described herein, and vice versa.

Multi-Fluid Kits for Three-Dimensional Printing

With this description in mind, FIG. 1 shows a schematic of an example multi-fluid kit 100 for three-dimensional printing. The kits can include a fusing agent 110 and a detailing agent 120. The detailing agent can include an aqueous liquid vehicle with a polyelectrolyte solubilized in the aqueous liquid vehicle. The fusing agent, on the other hand, can include water and a radiation absorber that can absorb radiation energy, e.g., electromagnetic radiation energy, energy in the form of heat, etc., and convert the radiation energy to heat.

In examples herein, the detailing agent 120 can include a polyelectrolyte, which can be considered to be a detailing compound capable of reducing the temperature of the powder bed material onto which the detailing agent is applied. In some examples, the detailing agent can be printed around the edges of the portion of the powder that is printed with the fusing agent. The detailing agent can increase selectivity between the fused and unused portions of the powder bed by reducing the temperature of the powder around the edges of the portion to be fused.

With more specific reference to the polyelectrolyte, this component can be present in the detailing agent 120 at from about 1 wt % to about 12 wt % based on the total content of the detailing agent, or can be present at from about 2 wt % to about 10 wt %, or from about 4 wt % to about 8 wt %. The polyelectrolyte can be a strong polyelectrolyte that is fully solubilized in the aqueous liquid vehicle, or substantially fully solubilized, e.g., from about 90 wt % to 100 wt % of the total content of the polyelectrolyte in the detailing agent is solubilized in the detailing agent. For example, polyelectrolyte can be a strong polyelectrolyte that is fully dissolved in the aqueous liquid vehicle of the detailing agent. The polyelectrolyte can be charged, such as anionic or cationic, but in one example, the polyelectrolyte can be an anionic polyelectrolyte. The polyelectrolyte can, for example, be a linear polymer and/or can have a weight average molecular weight from about 1,000 Mw to about 12,000 Mw, from about 1,000 Mw to about 8,000 Mw. In further detail, the polyelectrolyte can be water-absorbent, sometimes referred to as superabsorbent, e.g., absorbent at a water to polyelectrolyte weight ratio from about 2:1 to about 1,000:1, from about 4:1 to about 800:1, or from about 10:1 to about 500:1. In certain more specific examples, the polyelectrolyte can include poly(acrylic acid sodium salt), poly(acrylic acid potassium salt), poly(acrylic acid lithium salt), poly(acrylic acid ammonium salt), or a combination thereof. If the polyelectrolyte includes a poly(acrylic acid sodium salt), for example, the compound may have the structure:

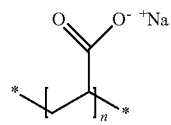

where n can be an integer, along with any capping groups that may be present, that provides a polymer having a weight average molecular weight from about 1,000 Mw to about 12,000 Mw. In a more specific example, n can be from about 10 to about 60, from about 12 to about 52, or from about 16 to about 40, for example.

In some examples, the detailing agent 120 can be mostly water. In a particular example, the detailing agent can be about 80 wt % to about 99 wt % water. In further examples, the detailing agent can be about 85 wt % to 99 wt % water, or about 90 wt % to 99 wt % water. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent 120 can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In some examples, the polyelectrolyte can be formulated in the detailing agent 120 with a secondary detailing compound, such as a solvent that evaporates at the temperature of the powder bed. In certain examples, if used, the second detailing compound can be water and/or an organic co-solvents. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof.

With specific reference to the radiation absorber present in the fusing agent 110, example compounds that can be used include a metal dithiolene complex, carbon black, a near-infrared absorbing dye, a near-infrared absorbing pigment, metal nanoparticles, a conjugated polymer, or a combination thereof. The fusing agent can be formulated with a radiation absorber (and ingredients other than the water, in some examples), to be colorless, though in other examples, fusing agent can have color, or can be black, grey, and/or white, for example.

In some examples, the fusing agent 110 can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used in the fusing agent 110. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M_2(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments that can be used in the fusing agent 110 include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber in the fusing agent 110 can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

A dispersant can be included in the fusing agent 110 in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent 110 can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, like the detailing agent, the fusing agent 110 can be applied onto the powder bed material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof. In accordance with the present disclosure, since the polyelectrolytes in the detailing agent have the ability to hold or retain water or other evaporative liquids, e.g., from 2 to 1,000 times the weight of the polyelectrolyte detailing compound included in the detailing agent, there may be higher levels of evaporative cooling than with the same solvents added for evaporative cooling, but which are not held in place by the polyelectrolytes of the present disclosure.

In some examples, the liquid vehicle formulation of the fusing agent 110 and/or the detailing agent 120 can be water or can be an aqueous liquid vehicle that includes water and a co-solvent or co-solvents present in total at from about 1 wt % to about 50 wt %, depending on the application architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

Classes of co-solvents that can be used in the fusing agent 110 and/or the detailing agent 120 can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

The fusing agent 110 and/or the detailing agent 120 can include a surfactant or multiple surfactants such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be used to enhance certain properties of the fusing agent and/or the detailing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCAR-CIDE™ (Union carbide Corp., Texas), VANCIDE® (R.T. Vanderbilt Co., Connecticut), PROXEL® (ICI Americas, N.J.), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt.

Three-Dimensional Printing Kits

Figure 2:
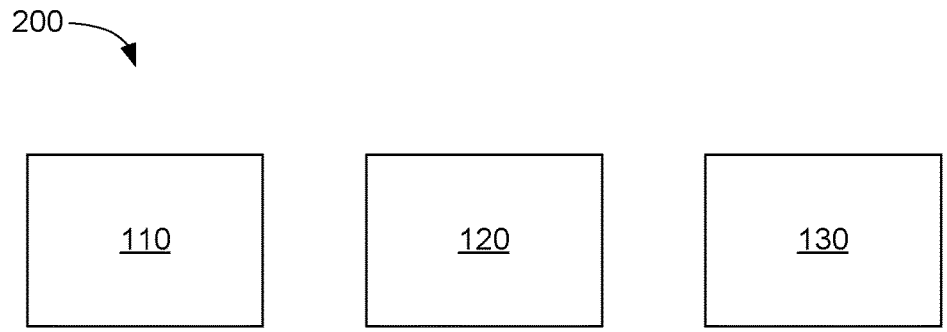
FIG. 2 is a schematic view an example three-dimensional printing kit in accordance with examples of the present disclosure.

The present disclosure also describes three-dimensional printing kits 200, as shown schematically in FIG. 2. In some examples, the three-dimensional printing kits can include materials that can be used in the three-dimensional printing processes described herein. More specifically, the three-dimensional printing kits described herein can include a powder bed material 130 including polymer particles, as well as the fusing agent 110 and the detailing agent 120 described previously in relation to the multi-fluid kit for three-dimensional printing.

With more specific reference to the powder bed material, this material can include polymer particles having a variety of shapes, such as spherical particles or irregularly-shaped particles. The polymer particles can be present in the powder bed material at from about 60 wt % to 100 wt %, from about 80 wt % to 100 wt % polymer particles, from about 90 wt % to 100 wt % polymer particles, from about 95 wt % to 100 wt % polymer particles, or from about 60 wt % to about 99 wt % polymer particles. In some examples, the polymer powder can be capable of being formed into 3D printed objects with a resolution of about 20 μm to about 100 μm, about 30 μm to about 90 μm, or about 40 μm to about 80 μm. As used herein, "resolution" refers to the size of the smallest feature that can be formed on a 3D printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of polymer particles with melting points or softening points in these ranges can be used, including thermoplastic polymer particles. For example, the polymer powder can include polyamide 6 powder, polyamide 9 powder, polyamide 11 powder, polyamide 12 powder, polyamide 6/6 powder, polyamide 6/12 powder, polyethylene powder, wax, thermoplastic polyamide, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or a mixture thereof. In a specific example, the polymer powder can be polyamide 12, which can have a melting point from about 175° C. to about 200° C. In another specific example, the polymer powder can be thermoplastic polyurethane.

The polymer particles can also, in some cases, be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, if other components are present such as a filler, a weight ratio of polymer particles to filler particles can be from about 100:1 to about 1:2 or from about 5:1 to about 1:1.

Three-Dimensional Printing Methods

Figure 3A:
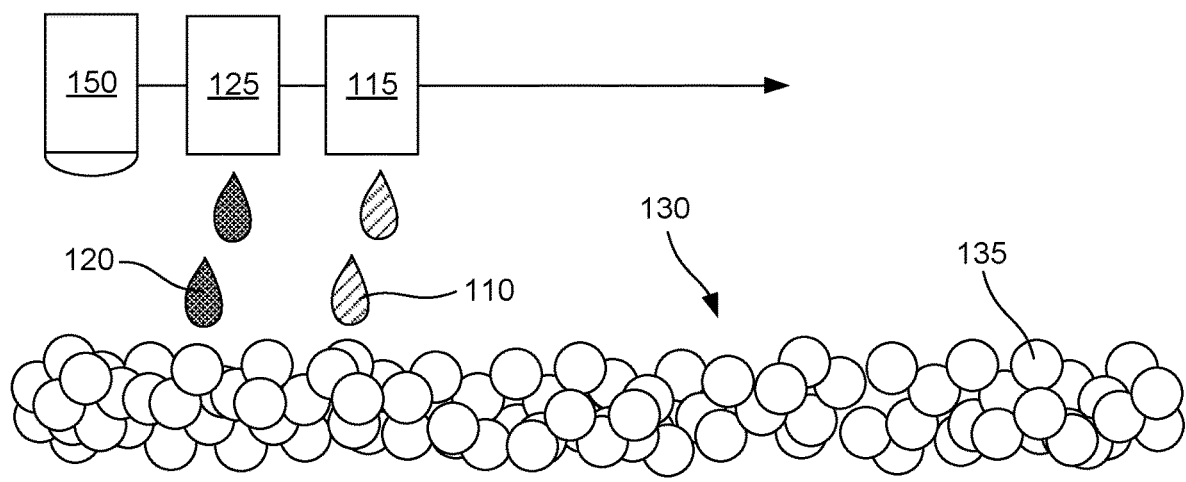
FIGS. 3A-3C show a schematic view of an example three-dimensional printing process using an example three-dimensional printing kit in accordance with examples of the present disclosure.

In particular, FIGS. 3A to 3C and FIG. 4 illustrate methods of printing or forming three-dimensional articles in accordance with the present disclosure. In FIG. 3A, for example, a fusing agent 110 is shown in the form of an ejected droplet from a fusing agent ejector 115, a detailing agent 120 shown in the form of an ejected from a detailing agent ejector 125, and a powder bed material 130, which includes polymer particles 132, is also shown. Thus, in an example, the fusing agent and the detailing agent can be ejected or jetted onto the powder bed, which includes a layer of the powder bed material 135, e.g., polymer particles and in some instances other particles may be present, where the fusing agent promotes fusing of the polymer particles together (inter-particulate and layer to layer), and the detailing agent provides thermal insulation and/or cooling properties when ejected at or near a border region of the part that is being formed through the three-dimensional printing process. These fluid ejectors can move across the layer of powder bed material to selectively jet fusing agent on areas that are to be fused, while the detailing agent can be jetted onto areas that are to be cooled. A radiation source 150 can also move across the layer of powder bed material.

In some cases, the powder bed can be preheated to a preheat temperature within about 10° C. to about 70° C. of the fusing temperature of the polymer powder. Depending on the type of polymer powder used, the preheat temperature can be in the range of about 90° C. to about 250° C., or about 90° C. to about 200° C., for example. The detailing compound can be a solvent that evaporates when it comes into contact with the powder bed at the preheat temperature, thereby cooling the printed portion of the powder bed through evaporative cooling.

The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are about 100 microns thick, then the fusing agent can penetrate about 100 microns into the polymer powder. Thus, the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

As described above, the detailing agent can be a fluid that reduces a temperature of the polymer powder on which the detailing agent is printed. In particular, a maximum temperature reached by the powder during exposure to electromagnetic energy can be less in the areas where the detailing agent is applied. The cooling effect may be due to the superabsorbent or water-retention properties of the polyelectrolyte materials described herein. For example, as the polyelectrolytes in the detailing agent have the ability to hold or retain water or other evaporative liquids, e.g., from 2 to 1,000 times the weight of the polyelectrolyte detailing compound included in the detailing agent, there may be higher levels of evaporative cooling than with the same solvents added for evaporative cooling, but which are not held in place by the polyelectrolytes of the present disclosure. To provide one specific example, the superabsorbent nature of poly(acrylic acid sodium salt) or PNaA, can provide for higher water or liquid vehicle concentration to be held where applied for cooling, leading to more efficient cooling, and can provide a greater insulating barrier to combat the effects of thermal bleed that may otherwise occur when using evaporative solvents or water without this superabsorbent material within the detailing agent.

In some examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the powder bed material), the detailing agent can be applied to these areas. Thus, the detailing agent can not only be applied at areas where there is a border region positioned laterally between the printed article and the unprinted powder bed material, but can be printed anywhere where the printed article may benefit from a cooling effect provided by the detailing agent and the polyelectrolytes carried therein.

Figure 3B:
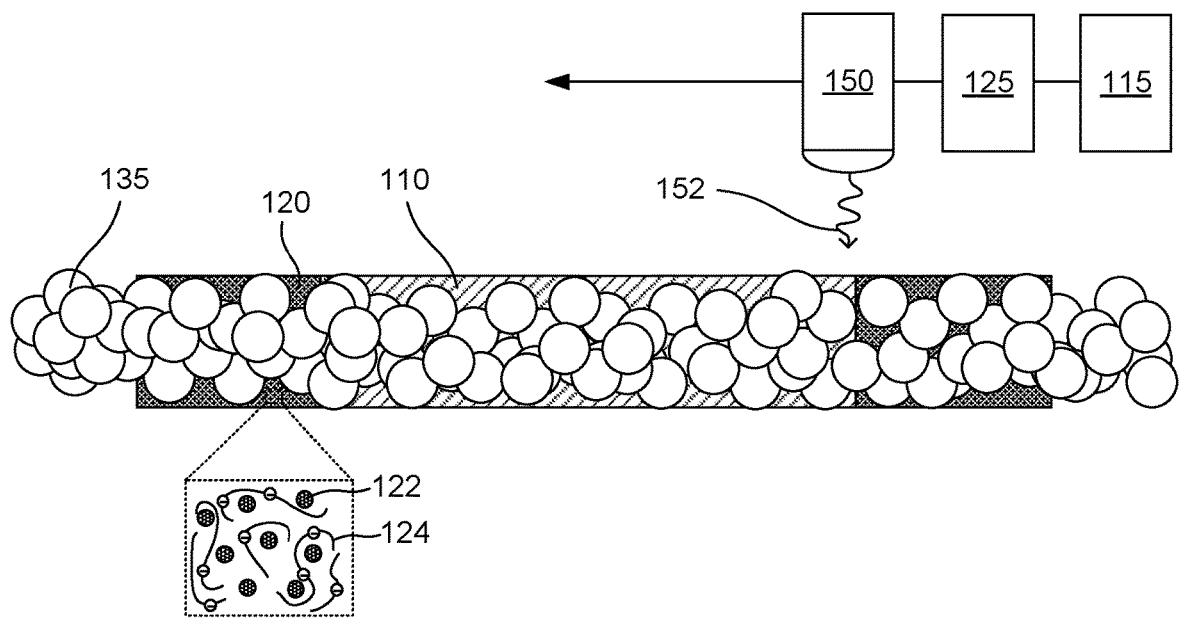

FIG. 3B shows the layer of powder bed material 130 after the fusing agent 110 and the detailing agent 120 have been jetted onto respective areas of the powder bed to be fused and/or to provide thermal insulation or cooling at or around the article that is being printed on a layer by layer basis. Detailing agent is shown in greater detail with aqueous liquid vehicle 122 (water or water-containing vehicle) is being held in place by a plurality of polyelectrolytes 124. The polyelectrolytes shown are anionic linear polyelectrolytes in this example. The fusing agent is jetted where the article is to be fused, and the detailing agent is jetted onto areas adjacent to the edges of the area to be fused. In this figure, the radiation source 150 is shown emitting radiation 152 toward the layer of powder build material shown, which is part of a powder bed (not shown in full but shown in part as one of the layers of the powder bed).

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 seconds to about 10 seconds per pass.

Figure 3C:
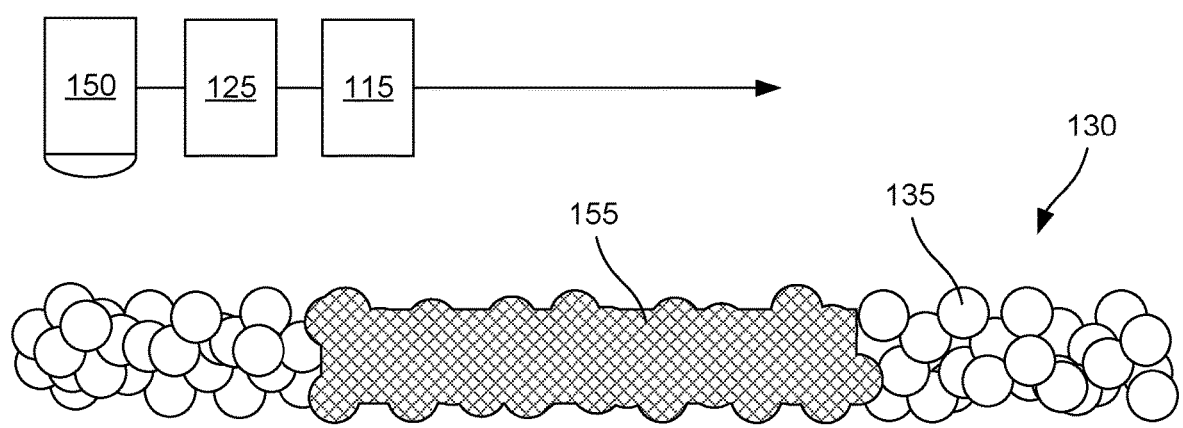

FIG. 3C shows the layer of powder bed material 130 with a fused portion 155 where the fusing agent was jetted and the radiation (152 of FIG. 3B) has interacted with the fusing agent to cause the polymer particles 135 of the powder bed material to fuse. In this example, a combination of the presence of the radiation absorber and the radiation together raise the temperature to cause the polymer particles to fuse and form the article. The area where the detailing agent was jetted remains as loose polymer particles, due in part to the cooling effect of the detailing agent with the polyelectrolyte present therein.

Figure 4:
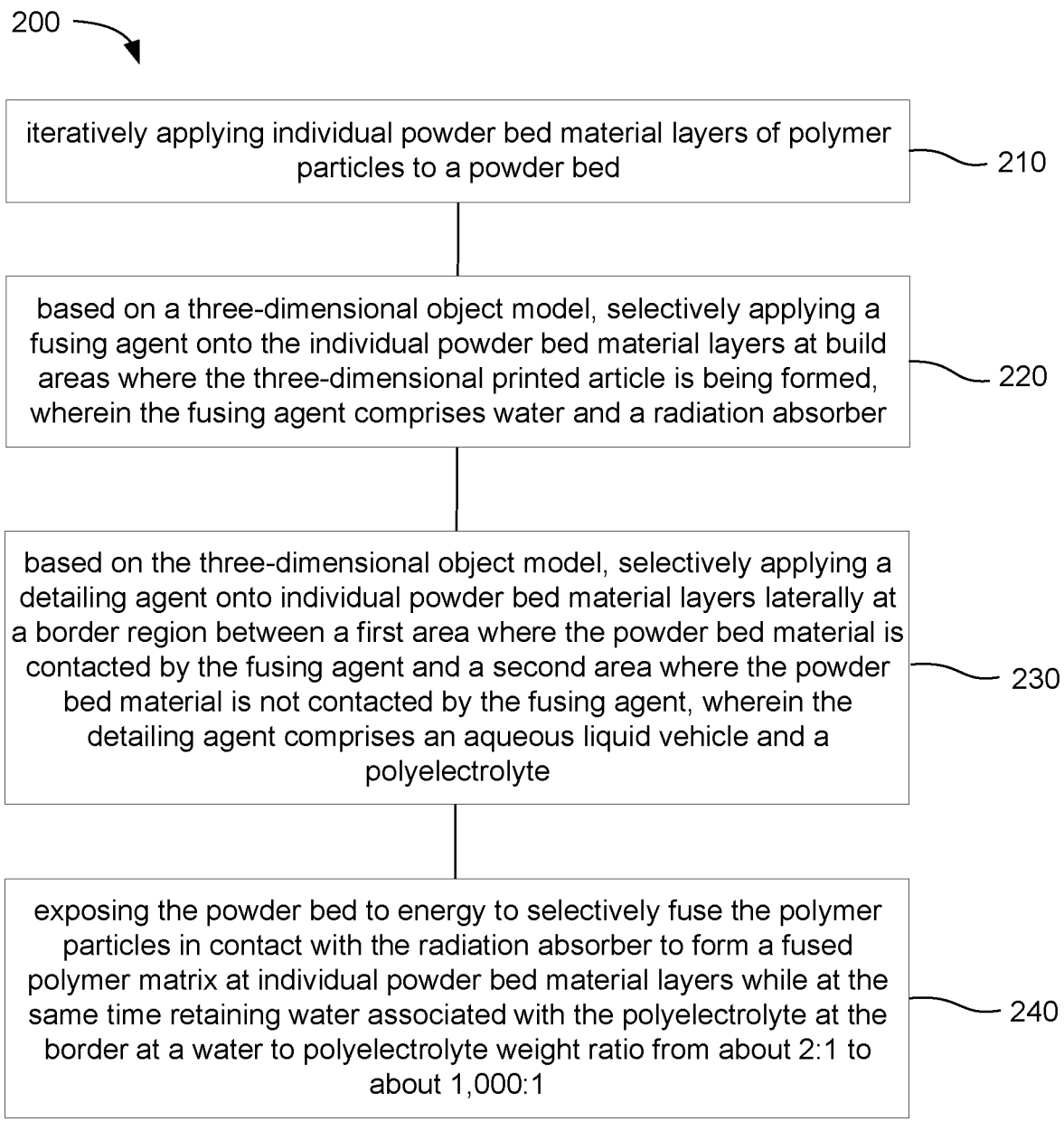
FIG. 4 is a flowchart illustrating an example method of making a three-dimensional printed article in accordance with examples of the present disclosure.

In further detail, this printing technology can be implemented in accordance with a method 200 of three-dimensional printing shown in FIG. 4, by way of example, there the method includes iteratively applying 210 individual powder bed material layers of polymer particles to a powder bed, and based on a three-dimensional object model, selectively applying 220 a fusing agent onto the individual powder bed material layers, wherein the fusing agent includes water and a radiation absorber. The method can further include, based on the three-dimensional object model, selectively applying 230 a detailing agent onto individual powder bed material layers laterally at a border region between a first area where the powder bed material is contacted by the fusing agent and a second area where the powder bed material is not contacted by the fusing agent, wherein the detailing agent includes an aqueous liquid vehicle and a polyelectrolyte. The method can further include exposing 240 the powder bed to energy to selectively fuse the polymer particles in contact with the radiation absorber to form a fused polymer matrix at individual powder bed material layers while at the same time retaining water associated with the polyelectrolyte at the border at a water to polyelectrolyte weight ratio from about 2:1 to about 1,000:1. In one example, the polyelectrolyte can be an anionic linear polyelectrolyte having a weight average molecular weight from about 1,000 Mw to about 12,000 Mw and can be water-absorbent at a water to polyelectrolyte weight ratio from about 2:1 to about 1,000:1. The polyelectrolyte can include poly(acrylic acid sodium salt), poly (acrylic acid potassium salt), poly(acrylic acid lithium salt, poly(acrylic acid ammonium salt), or a combination thereof, for example. The method can also further include selectively applying the detailing agent to build areas to control a temperature of a layer or layers of the three-dimensional printed article while being formed.

The 3D printed article can be formed by applying, e.g., jetting, ejecting, etc., a fusing agent onto layers of powder bed material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article. Other information may also be included, such as structures to be formed of additional different materials or color data for printing the article with various colors at different locations on the article. The 3D object model may also include features or materials specifically related to application fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the polyelectrolytes applied for cooling, and so on. All this information can be contained in a single 3D object file or a combination of multiple files. The 3D printed article can be made based on the 3D object model. In certain examples, software can be used to convert a 3D object model to instructions for a 3D printer to form the article by building up individual layers of powder bed material.

Definitions

It is noted that, as used in this specification and the appended claims, the singular forms "a," "an," and "the" include plural referents unless the context clearly dictates otherwise.

As used herein, "ink jetting" or "jetting" or "ejecting" refers to one specific type of application of fluids on to powder bed material using inkjet or other fluidic ejection architecture. Ink-jet architecture can include thermal or piezo architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are identified as a separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and fluid agents, materials kits, compositions, and/or methods may be devised without departing from the spirit and scope of the present disclosure. The appended claims are intended to cover such modifications and arrangements.

Example 1—Preparation of Fusing Agent (FA)

A fusing agent formulation was prepared in accordance with Table 1, as follows:

TABLE 1

Fusing Agent Formulation (FA)

| Ingredient | Concentration (wt %) |
|---|---|
| Near-IR Radiation Absorber | 5 |
| Organic Co-Solvent | 27 |
| Surfactant | 1.28 |
| Biocide | 0.35 |
| Buffer | 0.1 |
| Water | Balance |

Example 2—Preparation of Detailing Agent

A detailing agent formulation was prepared in accordance with Tables 2, as follows:

TABLE 2

Detailing Agent Formulations (DA1, DA2, and Control DA)

| Ingredient | DA1 (wt %) | DA2 (wt %) | Control DA (wt %) |
|---|---|---|---|
| Organic Cosolvent | 4 | 4 | 4 |
| Poly(acrylic acid sodium salt) Polyelectrolyte* | 7.5 | 10 | — |
| Surfactant | 0.85 | 0.85 | 0.85 |
| Anti-kogation Compound | 0.5 | 0.5 | 0.5 |
| Chelator | 0.05 | 0.05 | 0.05 |
| Biocide | 0.18 | 0.18 | 0.18 |
|  | 0.14 | 0.14 | 0.14 |
| Buffer | 0.1 | 0.1 | 0.1 |
| Water | Balance | Balance | Balance |

*Poly(acrylic acid sodium salt) at 1,200 Mw

Example 3—Thermal Fluidjet Printhead Performance of Detailing Agent with Polyelectrolyte A Detailing Agent prepared in accordance with Table 2 was prepared with 7.5 wt % poly(acrylic acid sodium salt). The poly(acrylic acid sodium was an anionic liner polymer having a weight average molecular weight of 1,200 Mw. In this specific example, a small amount of cyan dye was added, e.g., <0.1 wt % dye, so the Detailing Agent would be visible to verify printability. Further modification could be carried out to further enhance decap performance and/or other printability properties. Nevertheless, the Detailing Agent was confirmed to be printable, as evidenced by printing samples on a print media substrate, e.g., paper, and the samples were confirmed to have acceptable print quality.

Example 4—Detailing Agent Performance

Computer 3D object models were used to prepare two different types of articles designed to evaluate the effectiveness of detailing agent. One diagnostic article is referred to herein as a "gap checker" and the other diagnostic article is referred to herein as a "holey plate." For this evaluation, the powder build material used included 100 wt % polyamide-12 polymer particles.

The gap checker was designed to print a horizontal substrate or base with several pairs of vertical tiles (square) extending upward therefrom. The article was designed so that the pairs of vertical tiles had a gap therebetween (major surface facing major surface separated by the gap) ranging in distance between tiles of a pair from 0.1 mm to 0.5 mm. Detailing agent was deposited between the two plates of the various pairs during the build process. For the evaluation, the Detailing Agent with the polyelectrolyte was D1, prepared in accordance with Table 2. For comparison, a detailing agent that that excluded the polyelectrolyte (Control DA) was used. Then design of the "gap checker" article was such that if there was adequate separation between the individual pairs of plates, one of the plates could be remove or separated from the other by breaking one of the plates away from the other while keeping the other plate undamaged as attached to the horizontal substrate or base. To achieve this, one of the two vertical plates of the various pairs was not printed to be connected to the horizontal substrate, e.g., it was connected to the other vertical plate with detailing agent and powder build material therebetween. Thus, the more tiles that can be separated from their opposing tile of the pair, the better the gap clearance. For example, for a pair of tiles that can be separated down to 0.2 mm, then that would be better performance for the detailing agent than if the pairs of tiles could only be separated down to 0.3 mm. To account for variability, the parts were printed twice in both a default orientation and a 180° rotated orientation to account for potential temperature non-uniformity in the powder bed material as related to the 3D printing apparatus. The tile pairs printed with DA1 therebetween was able to provide acceptable gap clearance down to 0.2 mm, failing at 0.1 mm. the tile pairs printed with the Control DA therebetween was able to provide acceptable gap clearance down to 0.3 mm, failing at 0.2 mm and 0.1 mm.

The other diagnostic article was a hole-containing plate, or "holey plate," which is an article that evaluates hole clearance provided by detailing agent. In this experiment, the article printed based on the three-dimensional object model contained two rows of holes with increasing diameter ranging from 0.1 mm to 2.41 m (in about 0.1 mm increments) was printed to determine the extent to which each agent could provide hole clearance. For this evaluation, the closer in actual hole diameter to expected (or modeled) hole diameter, the better the dimensional accuracy. Furthermore, if more holes that can be cleared going from smallest to larges, the smaller the feature sizes that can be achieved using the detailing agent. More specifically, one row of holes that was printed used DA1 from Table 2, and a second row of holes used Control DA also shown in Table 2.

Figure 5:
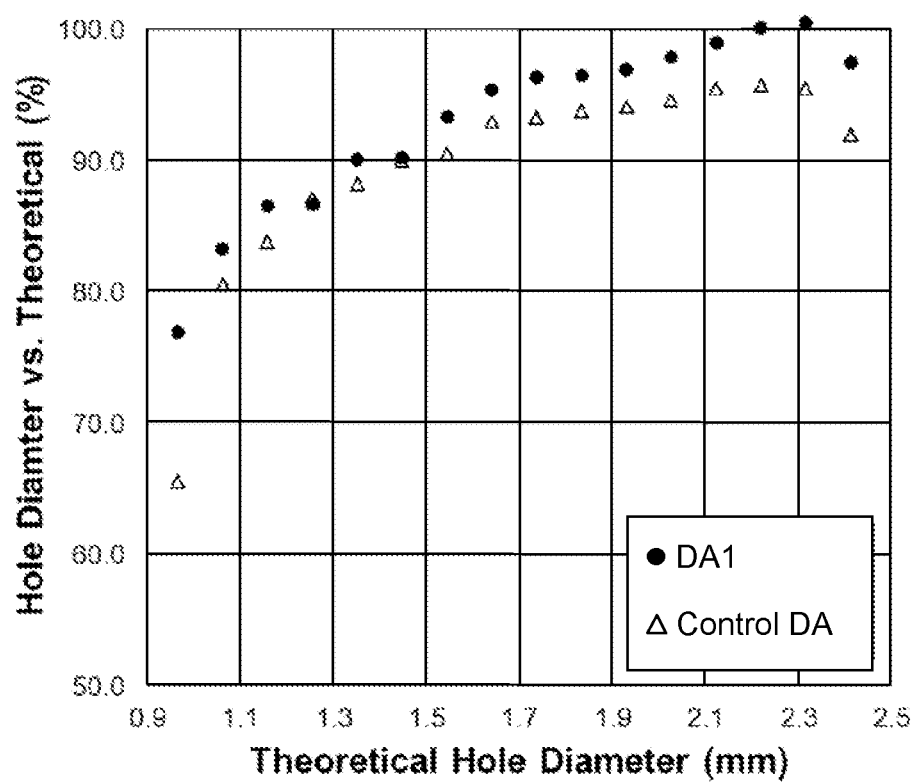
FIG. 5 is a graph showing hole clearance comparing the use of a detailing agent with and without a polyelectrolyte in accordance with the present disclosure.

Both agents were incorporated into the same article (in two different rows), and thus, the comparison is believed to be reflective of the performance of the two different detailing agents and hole clearing efficiency. Like with the gap checker evaluation above, it was found that DA1 was closer to its theoretical or modeled hole size than the Control DA. A graph of the results is shown in FIG. 5.

Both the gap checker article data and the holey plate article data, the evidence suggests that the presence of a polyelectrolyte in a detailing agent as described herein may provide access to smaller feature sizes than when using detailing agent without a polyelectrolyte present.

The powder bed material used for this example was the 100 wt % polyamide-12 powder, and the fusing agent used was that set forth in Example 1, Table 1. Two different detailing agents set forth in Example 1, Tables 2 (DA2) and 3 (DA3) were used for comparison. Other than the selection of detailing agent, the printing parameters were identical.

While the present technology has been described with reference to certain examples, various modifications, changes, omissions, and substitutions can be made without departing from the spirit of the disclosure. It is intended, therefore, that the disclosure be limited by the scope of the following claims.

What is claimed is:

1. A multi-fluid kit for three-dimensional printing, comprising:
   a fusing agent comprising water and a radiation absorber, wherein the radiation absorber absorbs radiation energy and converts the radiation energy to heat; and
   a detailing agent including:
      an aqueous liquid vehicle; and
      from about 1 wt % to about 12 wt % of a polyelectrolyte solubilized in the aqueous liquid vehicle at from about 90 wt % to 100 wt %, wherein the polyelectrolyte has a weight average molecular weight ranging from about 1,000 Mw to about 12,000 Mw and is water-absorbent at a water-to-polyelectrolyte weight ratio of from about 2:1 to about 1,000:1,
      wherein the detailing agent is devoid of a radiation absorber.

2. The multi-fluid kit of claim 1, wherein the polyelectrolyte is an anionic linear polyelectrolyte.

3. The multi-fluid kit of claim 1, wherein the polyelectrolyte is fully dissociated in the aqueous liquid vehicle.

4. The multi-fluid kit of claim 1, wherein the polyelectrolyte is selected from the group consisting of poly(acrylic acid sodium salt), poly(acrylic acid potassium salt), poly(acrylic acid lithium salt, poly(acrylic acid ammonium salt), and a combination thereof.

5. The multi-fluid kit of claim 1, wherein the polyelectrolyte is present in the detailing agent in an amount ranging from about 4 wt % to about 8 wt %.

6. The multi-fluid kit of claim 1, wherein the radiation absorber of the fusing agent is selected from the group consisting of a metal dithiolene complex, carbon black, a near-infrared absorbing dye, a near-infrared absorbing pigment, metal nanoparticles, a conjugated polymer, and a combination thereof.

7. The multi-fluid kit of claim 1, wherein the fusing agent is colorless.

8. A three-dimensional printing kit, comprising:
   a powder bed material comprising from about 60 wt % to 100 wt % of polymer particles;
   a fusing agent comprising water and a radiation absorber, wherein the radiation absorber absorbs radiation energy and converts the radiation energy to heat; and
   a detailing agent including:
      an aqueous liquid vehicle; and
      from about 1 wt % to about 12 wt % of a polyelectrolyte solubilized in the aqueous liquid vehicle at from about 90 wt % to 100 wt %, wherein the polyelectrolyte has a weight average molecular weight ranging from about 1,000 Mw to about 12,000 Mw and is water-absorbent at a water to polyelectrolyte weight ratio of from about 2:1 to about 1,000:1,
      wherein the detailing agent is devoid of a radiation absorber.

9. The three-dimensional printing kit of claim 8, wherein the polymer particles are selected from the group consisting of polyamide 6 particles, polyamide 9 particles, polyamide 11 particles, polyamide 12 particles, polyamide 6/6 particles, polyamide 6/12 particles, polyethylene particles, thermoplastic polyurethane particles, thermoplastic polyamide particles, polypropylene, polyester particles, polycarbonate particles, polyether ketone particles, polyacrylate particles, polystyrene powder particles, wax particles, and a combination thereof.

10. The three-dimensional printing kit of claim 8, wherein the polyelectrolyte is an anionic linear polyelectrolyte having a weight average molecular weight ranging from about 1,200 Mw to about 5,000 Mw.

11. The three-dimensional printing kit of claim 8, wherein the radiation absorber of the fusing agent is selected from the group consisting of a metal dithiolene complex, carbon black, a near-infrared absorbing dye, a near-infrared absorbing pigment, metal nanoparticles, a conjugated polymer, and a combination thereof.

12. A method of making a three-dimensional printed article, comprising:
   iteratively applying individual powder bed material layers of polymer particles to a powder bed;
   based on a three-dimensional object model, selectively applying a fusing agent onto the individual powder bed material layers at build areas where the three-dimensional printed article is being formed, wherein the fusing agent comprises water and a radiation absorber;
   based on the three-dimensional object model, selectively applying a detailing agent onto individual powder bed material layers laterally at a border region between a first area where the powder bed material is contacted by the fusing agent and a second area where the powder bed material is not contacted by the fusing agent, wherein the detailing agent comprises an aqueous liquid vehicle and from about 1 wt % to about 12 wt % of a polyelectrolyte solubilized in the aqueous liquid vehicle at from about 90 wt % to 100 wt %, wherein the polyelectrolyte has a weight average molecular weight ranging from about 1,000 Mw to about 12,000 Mw, wherein the detailing agent is devoid of a radiation absorber; and
   exposing the powder bed to energy to selectively fuse the polymer particles in contact with the radiation absorber to form a fused polymer matrix at individual powder bed material layers while retaining water associated with the polyelectrolyte at the border at a water-to-polyelectrolyte weight ratio of from about 2:1 to about 1,000:1.

13. The method of claim 12, wherein the polyelectrolyte is selected from the group consisting of poly(acrylic acid sodium salt), poly(acrylic acid potassium salt), poly(acrylic acid lithium salt, poly(acrylic acid ammonium salt), and a combination thereof.

14. The method of claim 12, wherein the selectively applying of the detailing agent to the build areas includes controlling a temperature of at least one layer of the three-dimensional printed article while being formed.

* * * * *